United States Patent [19]

Berkeley et al.

[11] Patent Number: 5,065,813
[45] Date of Patent: Nov. 19, 1991

[54] INTERACTIVE ELECTRONIC THERMOSTAT WITH INSTALLATION ASSISTANCE

[75] Inventors: Arnold D. Berkeley, 10687 Weymouth St., Apt. 102, Bethesda, Md. 20814; Alec Bernstein; Daniel C. Carney, both of Baltimore, Md.

[73] Assignee: Arnold D. Berkeley, Bethesda, Md.

[21] Appl. No.: 282,319

[22] Filed: Dec. 9, 1988

[51] Int. Cl.⁵ .......................... F25B 29/00; F25B 49/00
[52] U.S. Cl. ..................................... 165/1; 165/11.1;
  165/12; 165/26; 236/94; 62/77; 62/127; 62/298
[58] Field of Search .......................... 62/298, 77, 127;
  165/11.1, 12, 26, 1; 236/94; 324/417

[56] References Cited

U.S. PATENT DOCUMENTS

| | | |
|---|---|---|
| 4,199,023 | 4/1980 | Phillips . |
| 4,292,813 | 10/1981 | Paddock ..................... 62/158 |
| 4,338,791 | 7/1982 | Stamp, Jr. et al. ............. 165/29 |
| 4,354,241 | 10/1982 | Barello ..................... 364/492 |
| 4,356,962 | 11/1982 | Levine ..................... 165/26 |
| 4,408,711 | 10/1983 | Levine . |
| 4,453,590 | 6/1984 | Holliday et al. ............. 165/12 |
| 4,460,123 | 7/1984 | Beverly . |
| 4,469,274 | 9/1984 | Levine ..................... 236/46 R |
| 4,473,183 | 9/1984 | Kensinger et al. ............. 236/46 R |
| 4,663,940 | 5/1987 | Suzuki et al. ................ 236/94 |
| 4,694,890 | 9/1987 | Zarate . |
| 4,716,957 | 1/1988 | Thompson et al. ............ 236/46 R |
| 4,725,001 | 2/1988 | Carney et al. ............... 236/11 |
| 4,795,088 | 1/1989 | Kobayashi et al. ............ 165/29 |

FOREIGN PATENT DOCUMENTS 0146943 11/1981 Japan ................................. 236/94

OTHER PUBLICATIONS

Hunter Energy Monitor II Owner's Manual Model 42203, Hunter Fan Co., 2500 Frisco Ave., Memphis, Tenn., 1986, pp. 1-35.

Primary Examiner—John K. Ford
Attorney, Agent, or Firm—Beveridge, DeGrandi & Weilacher

[57] ABSTRACT

An interactive electronic thermostat operates to communicate with an installed through an audible or visual display and keypad to instruct the installer to perform tasks and enter observations to effect proper connections at the thermostat of heater/air conditioner wires in spite of the absence of labels identifying the functions of those wires. The thermostat requires entry of coded indicia representing operator-observed conditions in the system in response to displayed instructions carried out by the operator. Control circuits are automatically assigned functional tasks in response to the operator-observed conditions entered into the system. Different program routines are invoked depending upon the number of system wires and the type of heater/air conditioner being controlled. Under appropriate circumstances, messages are displayed informing the operator/homeowner that the thermostat is incompatible, or has no advantageous use, with the heater/air conditioner. In one embodiment the installer need only connect the wires to the thermostat terminals one time; the thermostat reconfigures its internal connection paths in response to installer-entered indicia to assure proper control of the system.

32 Claims, 6 Drawing Sheets

INTERACTIVE ELECTRONIC THERMOSTAT WITH INSTALLATION ASSISTANCE

BACKGROUND OF THE INVENTION

1. Technical Field

The present invention relates to electronic thermostats for heating/cooling systems and, more particularly, to thermostats employing a user-interactive microprocessor controlled by unique software to facilitate installation and user interaction.

2. Discussion of the Prior Art

The specific embodiment of the present invention described herein is disclosed in the context of the heating/cooling system that is the subject of our U.S. Pat. No. 4,725,001, issued Feb. 16, 1988, the disclosure of which is expressly incorporated herein in its entirety by this reference. In fact, a portion of the present invention was initially disclosed in that patent. It is to be understood, however, that the inventive concepts utilized in the specific disclosed embodiment of the present invention have application in a wide variety of types of heating, ventilating and air-conditioning (HVAC) systems and are not limited to the particular system disclosed in the aforementioned patent.

There are numerous electronic thermostats known in the prior art, some of which are disclosed in U.S. Pat. Nos. 4,172,555 (Levine '555); 4,199,023 (Phillips); 4,206,872 (Levine '872); 4,356,962 (Levine '962); 4,408,711 (Levine '711); 4,460,123 (Beverly); 4,469,274 (Levine '274); and 4,473,183 (Kensinger et al.). Some of these electronic thermostats include microprocessors controlled by specifically formulated software designed to effect intended heating/cooling system operation. Specifically, the aforementioned Beverly patent discloses a thermostat utilizing a microprocessor. All prior art electronic thermostats have been difficult for the average homeowner to install, particularly when replacing a thermostat in a pre-existing HVAC system. In particular, the wires of an existing system are not labeled as to function, (i.e., burner, fan, air conditioner, voltage supply, etc.) and it is quite likely that the wires can be improperly connected, possibly causing damage system equipment. Consequently, the installation of prior art electronic thermostats, has required trained personnel to avoid damage to the system.

In addition, when a thermostat is replaced in a pre-existing HVAC system, it is possible that the new thermostat will be incompatible with the pre-existing system. For example, in the case of the HVAC system described in our aforementioned U.S. Pat. No. 4,725,001, the system utilizes a unique cycling arrangement of on-time and pause intervals. That particular cycling arrangement may not be compatible with heat pumps or with certain types of boiler heating units, namely: (1) steam radiator heating systems; or (2) any boiler in which the fluid is heated by an immersion type heater such that the fluid temperature and fluid circulation are separately controlled. Under such circumstances the homeowner/operator must be made aware of the incompatibility and must be instructed to either have the system modified or to return the thermostat to the place of purchase.

OBJECTS AND SUMMARY OF THE INVENTION

It is therefore an object of the present invention to provide a method and apparatus for facilitating installation of an interactive electronic thermostat such that improper connections and resulting damage are virtually eliminated. In this regard, an interactive electronic thermostat is any thermostat that permits interaction between the thermostat and the installer or user.

Installation of a thermostat in accordance with one embodiment of the present invention is achieved with the aid of instructional software arranged to successively prompt the homeowner by visual or audible prompts, in his native language (e.g., English), to make certain connections and to actuate certain equipment. Likewise, the prompting provided by the software during the entry of set points into the system is in the native language of the system user. Control circuits in the thermostat are assigned appropriate functions depending on the user's responses. In addition, the software requests certain information from the homeowner in order to determine whether or not the pre-existing HVAC system is compatible with the thermostat being installed.

In a second embodiment of the invention interactive software permits the user to connect the wires of the HVAC system to any thermostat terminal. The system automatically determines the function of each wire and connects the thermostat control circuits to the appropriate thermostat terminals accordingly.

BRIEF DESCRIPTION OF THE DRAWINGS

The above and still further objects, features and advantages of the present invention will become apparent upon consideration of the following detailed description of preferred embodiments thereof, especially when taken in conjunction with the accompanying drawings, wherein like reference numerals in the various figures are utilized to designate like components, and wherein.

DESCRIPTION OF THE PREFERRED EMBODIMENTS

Figure 1:
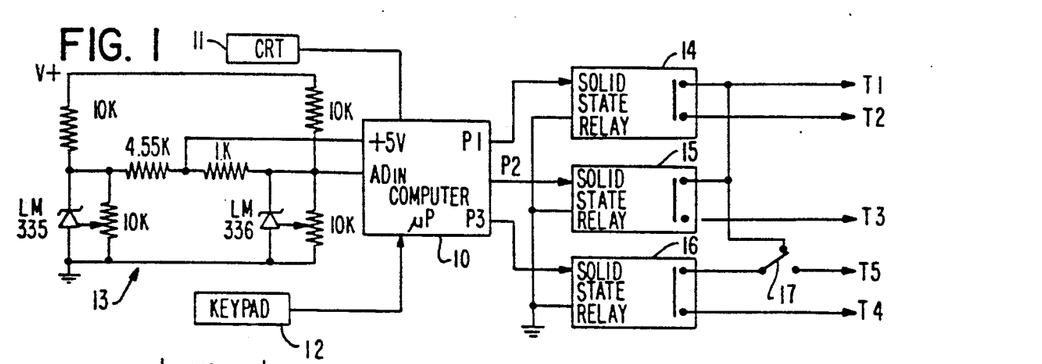
FIG. 1 is a schematic diagram of the interactive electronic thermostat of the present invention including the interconnections between the microprocessor and the temperature sensor, and between the microprocessor and the HVAC system.

The electronic thermostat of the present invention is illustrated schematically in FIG. 1 of the accompanying drawings to which specific reference is now made. The thermostat includes a microprocessor 10, a display unit 11, a keypad 12, circuitry 13 for providing a measured temperature-indicative signal to the microprocessor, and solid state relays 14, 15 and 16 for connecting the microprocessor to the HVAC system. Microprocessor 10 may be any commercially available microprocessor or the equivalent (e.g., programmable logic array, application-specific integrated chip, etc.) capable of functioning in a manner consistent with the description set forth herein. In a prototype version of the invention which has been constructed and tested, a Commodore Model 64 computer was utilized for microprocessor 10; a Hewlett Packard Model HP-871 is also suitable. Display unit 11 may be any cathode ray tube (CRT) display unit compatible with the particular microprocessor employed. Alternatively, a light emitting diode or liquid crystal display unit may be employed. Keypad 12 may also be any input keypad (or keyboard) device compatible with the microprocessor. It will also be appreciated that the various prompts described below may be audible, rather than visual prompts such as might be effected by voice simulation. Likewise, voice input may be employed in place of a keypad if the thermostat is equipped with a voice recognition capability.

The temperature indication circuit 13 is the Fahrenheit Thermometer Application Circuit illustrated in the National Semi-Conductor Linear Databook, 1982 edition, at page 9-29. That circuit provides an accurately calibrated analog signal representative of the ambient temperature, in degrees Fahrenheit, to which the precision temperature sensor LM 335 (National Semi-Conductor Corporation) is exposed. Typically, the precision temperature sensor is disposed in a room, home, or other space to be heated and/or cooled by the system controlled by the thermostat of the present invention. Circuit 13 includes a voltage reference diode LM 336 (National Semiconductor Corporation) connected as a 2.5 volt reference having a temperature coefficient that is independent of its breakdown voltage. The temperature indicative output signal from circuit 13 is connected to the analog-to-digital converter input port of computer 10. Power for the circuit is provided from the +5 volt supply terminal of the computer. It will be understood that the particular circuit 13 illustrated in FIG. 1 is only one example of many temperature responsive circuits that may be employed with the present invention.

The solid state relays 14, 15 and 16 are respective control circuits serving to connect the computer 10 to the HVAC system via system wires at terminals T1, T2, T3 and T4, in the case of a four-wire system, or at terminals T1, T2, T3, T4 and T5, in the case of a five-wire system. Solid state relays 14, 15 and 16 are preferably opto-isolators, such as Opto 22 Model MP 120 D2, and are selectively energizable by computer 10, under software control, to close circuit contacts connected to the system wires. Any other control circuits capable of providing the functions described herein may be used in place of the preferred opto-isolators. In the illustrated embodiment the energizing input circuit for each solid state relay is referenced to ground, relay 14 is energized via computer output port P1, relay 15 is energized via computer output port P2, and relay 16 is energized via computer output port P3.

The solid state relays are employed as part of the feature of the present invention which permits foolproof proper connection of the thermostat terminals to the wires of the HVAC system during installation. To this end, one side of the contact for each of relays 14 and 15 is connected to terminal T1; the same side of the contact for relay 16 is connected through a switch 17 to terminal T1 when switch 17 is in its illustrated position. Switch 17 is placed in the illustrated position by the installer when the heating/cooling system is a four-wire system; the switch is placed in its other position when a five-wire system configuration is being served by the thermostat. Five-wire systems are typically used when the air conditioner has a voltage supply transformer that is separate and apart from the heating system supply transformer. The other side of the contacts for relays 14, 15 and 16 are connected to terminal T2, T3 and T4, respectively. Switch 17 connects terminal T5 to the first-mentioned side of the contact of relay 16 for the five-wire system.

FOUR-WIRE INSTALLATION

Figure 2:
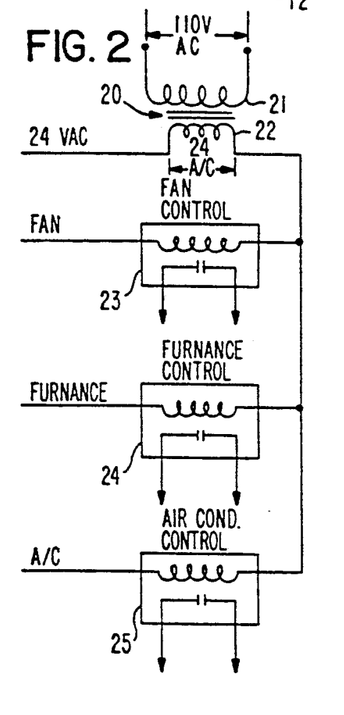
FIG. 2 is a schematic diagram of a conventional four-wire forced air HVAC system to which the circuit of FIG. 1 can be connected in accordance with the present invention.

A typical and conventional four-wire HVAC system is illustrated schematically in FIG. 2 to which specific reference is now made. Primary power, typically 110 volts, 60 Hz, is applied across the primary winding 21 of a transformer 20 and is stepped down to 24 volts across secondary winding 22. A 24 V AC line is one of the four-wires of the system to be connected to the thermostat and is derived from one side of secondary winding 22. The other side of the secondary winding is connected to one side of each of three relay coils for the fan control relay 23, the furnace control relay 24 and the air conditioner control relay 25, respectively. The opposite sides of these three relay coils are the Fan, Furnace, the A/C wires constituting the other three wires of the four system wires. It will be appreciated that when the 24 V AC line is connected to any or all of the other three wires via solid state relays 14, 15, 16 (FIG. 1), the relays associated with those wires are energized thereby to close the contacts associated with the energized relay and turn on the appropriate function (i.e., fan, furnace, air conditioner).

Figure 5:
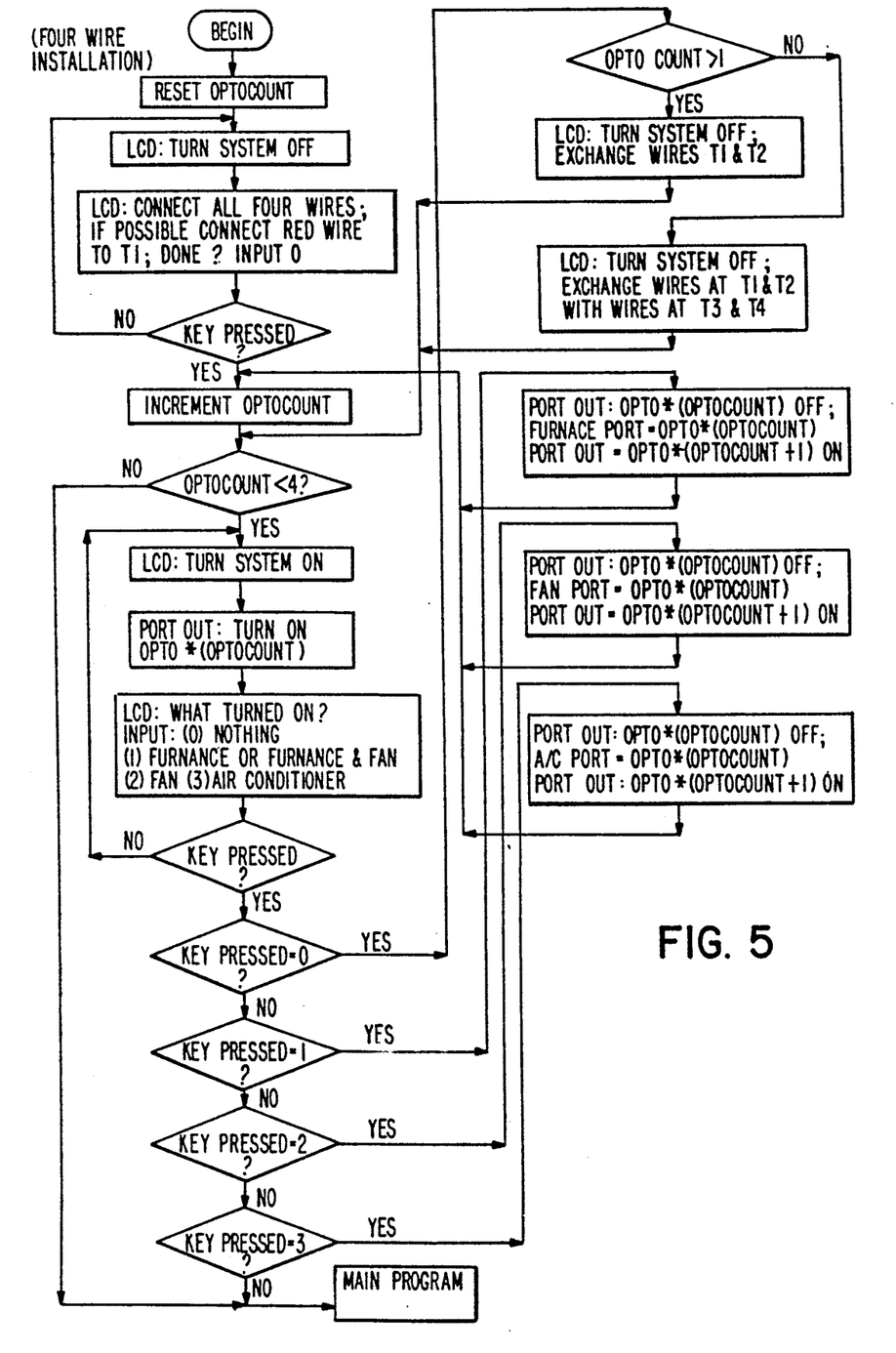
FIG. 5 illustrates the program routine for interaction with the system user to instruct proper connection of the thermostat to a four-wire HVAC system such as illustrated in FIG. 3.

In order for the thermostat to operate, it is important that the 24 V AC line be connected at terminal T1 (FIG. 1) which contacts one side of each of the solid state relays 14, 15 and 16. The Fan, Furnace and A/C lines are connected to the other sides of respective relays so that energization of each relay effects the appropriate furnace function. Connection of any two lines other than the 24 V AC line to a relay precludes operation of the functions associated with those lines. Since the wires from the furnace are not labeled by function and are, more often than not, uncoded, it is unlikely that the 24 V AC line will be connected to the T1 terminal by mere chance. Consequently, the software stored in computer 10 is provided with an interactive installation program or routine for a four-wire system. The flow chart for that program is illustrated in FIG. 5 to which specific reference is made in the following discussion.

Entry into the four-wire installation routine maybe initiated by the entry of a particular combination of digits from keypad 12 (FIG. 1) that is recognized by the computer as a request to begin a four-wire installation procedure. The particular combination of numbers to be entered would typically be described in the installation instructions provided with the thermostat. (A different number combination code would be required for entry into a five-wire installation procedure under the control of the software routine illustrated in FIG. 6 or a boiler installation procedure under the control of the software routine illustrated in FIG. 7). For the four-wire installation, a parameter designated "Optocount" is established and represents, at any time, one of the solid state relays 14, 15, 16, or none of these relays. At the start of the procedure the Optocount is reset and the installer is instructed, at display 11, to turn the HVAC system off. This, and all other displayed instructions, appear or are audibly rendered in the English language or other national language of the country in which the system is installed. After the system has been turned off, as would typically be signified by the actuation of a key at the keypad 12, the installer is instructed to connect all four wires from the heating/cooling system to respective terminals T1 through T4. The instruction indicates that the red wire, if any, should be connected to T1 since red is often used to code the hot or power wire and may, therefore, be the 24 V AC line. In any event, after all four wires are connected, irrespective of whether or not they are correctly connected by function, the installer is instructed to depress the 0 key at keypad 12. When this has been done the Optocount is incremented by one count to a count of one to represent port P1 and solid state relay 14. Since at this time the Optocount is less than four, the installer is instructed to turn the system on. In addition, the output port (in this case P1) of computer 10 corresponding to the Optocount delivers a signal to energize the solid state relay associated with that Optocount. In other words, solid state relay 14 is energized. The installer is then asked to indicate, by depression of an appropriate key at keypad 12, what occurred by virtue of the system having been turned on and solid state relay 14 having been energized. With relay 14 energized, terminals T1 and T2 are shorted together. If one of the four lines connected to T1 or T2 is the 24 V AC line, either the fan, the furnace or the air conditioner will be activated by the energization of relay 14 since the other connected line will be the FAN, FURNACE, or A/C line. If the installer depresses a "0", signifying that neither the fan, the furnace nor the air conditioner was activated, the Optocount is examined to determine whether or not is exceeds a value of one. Since, under the assumed conditions, the Optocount is equal to one, the result of the examination is negative. The program then instructs the installer to exchange the wires connected at T1 and T2 with the wires connected at T3 and T4; the installer is also instructed to turn the system off. Following this the software then loops back to repeat the previous steps beginning with a determination as to whether or not the Optocount is less than four. This time, however, one of the two leads connected to T1 and T2 will be the 24 V lead so that the installer, after turning the system back on, enters either "1" (signifying that the furnace or furnace and fan have been energized), "2" (signifying that the fan only has been energized), or "3" (signifying that the air conditioner has been energized). The software then makes one or more inquiries to determine which of the keys has been pressed by the installer. Assuming that the installer presses the "1" key, the computer output port corresponding to the Optocount is de-activated to de-energize the corresponding solid state relay (in this case relay 14). Since the "1" key indicated that the furnace had been energized, the computer port corresponding to the Optocount (namely P1) is designated as the furnace port; accordingly, relay 14 is assigned the function of controlling operation of the furnace. The next output port P2, corresponding to Optocount plus one, is then activated to energize solid state relay 15. The software then loops back to the point in the loop where the Optocount is incremented.

With the Optocount now at a value of two, the procedure repeats so that the installer is once again requested to enter a numeral corresponding to what is observed when the system is turned on. At this time, since the 24 V AC and FURNACE lines are connected at T1, T2, the only possibilities when the system is turned on are that nothing happened, or the fan was energized, or the air conditioner was energized. The possibility of nothing happening occurs only when the 24 V AC line is connected to T2 rather than T1, the latter being tied to one side of each of the relays 14, 15 and 16. Assuming this to be the case, a "0" is entered by the installer and, since the Optocount is greater than one, the installer is prompted by the display to exchange the two wires at T1 and T2. At this point in time the 24 V AC line is properly connected to T1 and the FURNACE line is connected to T2. Further, the FAN and A/C lines are connected at T3 and T4, although not necessarily in that order. The software now loops back to the point where the determination is made as to whether or not the Optocount is less than four.

Once again the installer is prompted to turn the system on and the computer output port (P2) corresponding to the current Optocount is activated, thereby energizing solid state relay 15. Only two possibilities now remain, depending on whether the FAN or A/C line is connected to T3. If the FAN line is so connected, a "2" will be pressed by the installer and detected by the system. As a result the P2 output port of computer 10, corresponding to the current Optocount, is deactivated and designated as the fan port, thereby assigning to relay 15 the function of controlling fan operation. The P3 port, corresponding to a value of the Optocount plus one, is activated to energize relay 16. The software then loops back to the point at which the Opto-count is incremented to a value of three and output port P3 is activated.

After the system is turned on, the only remaining possibility is that the air conditioner is energized, in response to which the installer enters the number "3" via keypad 12. Relay 16, therefore, must be assigned the task of controlling air conditioner operation. Accordingly, the software deactivates the P3 port, designates that port as the air conditioner port and activates the computer port corresponding to output port plus one. This port is not connected to the system so that no effect is observed. The software loops back to the point at which the Optocount is incremented and a determination is now made that the Optocount is not less than four; in fact, the Optocount is equal to four. Under these circumstances the system recognizes completion of the installation procedure and directs the program to the Main Program described in our aforementioned U.S. Pat. No. 4,725,001 or to an appropriate point in other programs utilized in any other electronic set back or set forward thermostat.

From the foregoing it will be appreciated that the concept behind the four-wire installation procedure is that the first relay 14 is energized and the installer is required to inform the system as to which of the fan, furnace or air conditioner has been energized. If one of these is energized, the activated port is designated by the system as the port dedicated to the energized component, and the corresponding relay is assigned to control that component. If nothing is energized the system recognizes that the 24 V line has not been connected at T1 or T2 and therefore requires that the pair of wires at T1 and T2 be exchanged with the pair of wires at T3 and T4. Under such circumstances one of the fan, furnace and air conditioner will be energized and the appropriate computer port and relay are assigned to the energized component. Assurance that the 24 V AC line is connected to T1 is provided at the time the P2 port is to be assigned (after the P1 port has been assigned). If none of the components are energized after the P1 port has been assigned, the system recognizes that the 24 V AC line has been connected to T2 rather than T1 and requires the installer to exchange these two wires. The system then proceeds to determine which components are connected to T3 and T4, in response to the installer's key entry, and assigns the computer output ports appropriately.

FIVE-WIRE INSTALLATION

Figure 3:
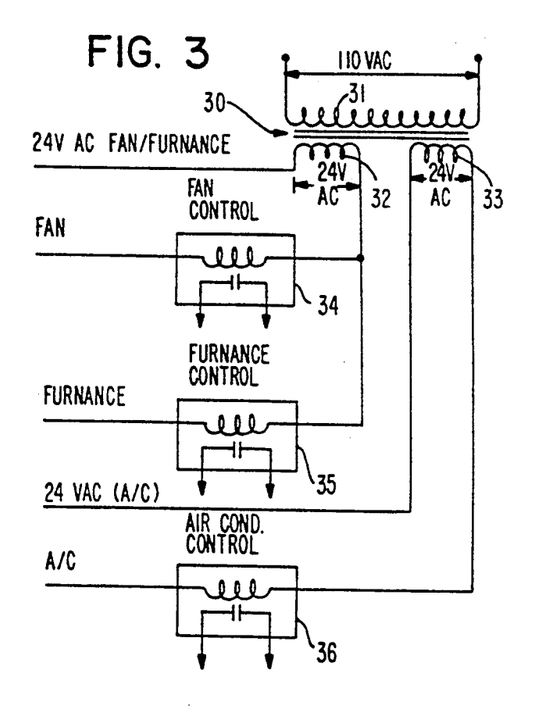
FIG. 3 is a schematic diagram of a conventional five-wire forced air HVAC system to which the circuit of FIG. 1 can be connected in accordance with the present invention.

A typical five-wire heating/cooling system is illustrated schematically in FIG. 3 to which specific reference is now made. Primary power is applied across primary winding 31 of transformer 30 and is stepped down to 24 volts at each of two separate and isolated secondary windings 32 and 33. Secondary winding 32 is associated with the furnace and fan and has one side thereof designated 24 V AC(FAN/FURNACE). The other side of winding 32 is connected to one side of the relay coils in each of the fan control relay 34 and furnace control relay 35. The other side of the fan control relay coil is the system FAN line; the other side of the furnace control relay coil is the system FURNACE line.

Secondary winding 33 is dedicated to the air conditioner and has one side thereof dedicated 24 V AC-(A/C) and the other side thereof connected to the relay coil in the air conditioner control relay 36. The other side of the air conditioner control relay coil is designated A/C.

Figure 4:
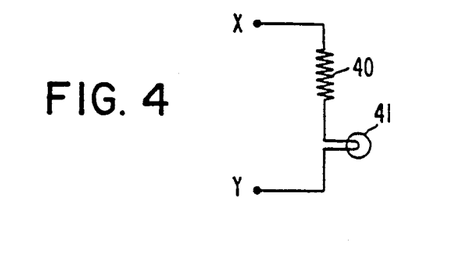
FIG. 4 is a schematic diagram of a lamp circuit employed in the process of connecting the circuit of FIG. 1 to the circuit of FIG. 3.

For installation of the thermostat in a five-wire system, switch 17 (FIG. 1) is switched to connect T5 to one side of the contact for solid state relay 16, thereby isolating that relay contact from the others. This is consistent with the isolation provided between the air conditioner relay 36 and the other two relays 34, 35 by virtue of the separate secondary windings 33 and 32. It will be appreciated that installation of the thermostat in a five-wire system faces one problem which is not present in the four-wire system. Specifically, it is possible that the 24 V AC(FAN/FURNACE) line might be short-circuited to the separate 24 V AC(A/C) line if these two lines are connected to the same relay 14, 15 or 16 and if that relay is energized. Since the wires are not labeled, the possibility of this improper connection is not remote. Moreover, other undesirable connection combinations may be made, resulting in improper indications and operations of the system. Consequentially, a special lamp circuit, illustrated in FIG. 4 is employed for the five-wire system installation procedure. This lamp circuit includes a resistor 40 and an indicator lamp 41 connected in series between two terminals X and Y. Lamp 41 is typically a 12 volt (AC) lamp, and resistor 40 has a typical resistance of about three hundred fifty ohms. This lamp circuit permits connections to be checked before the relays 14, 15 and 16 are energized, thereby preventing improper and potentially dangerous connections.

Figure 6:
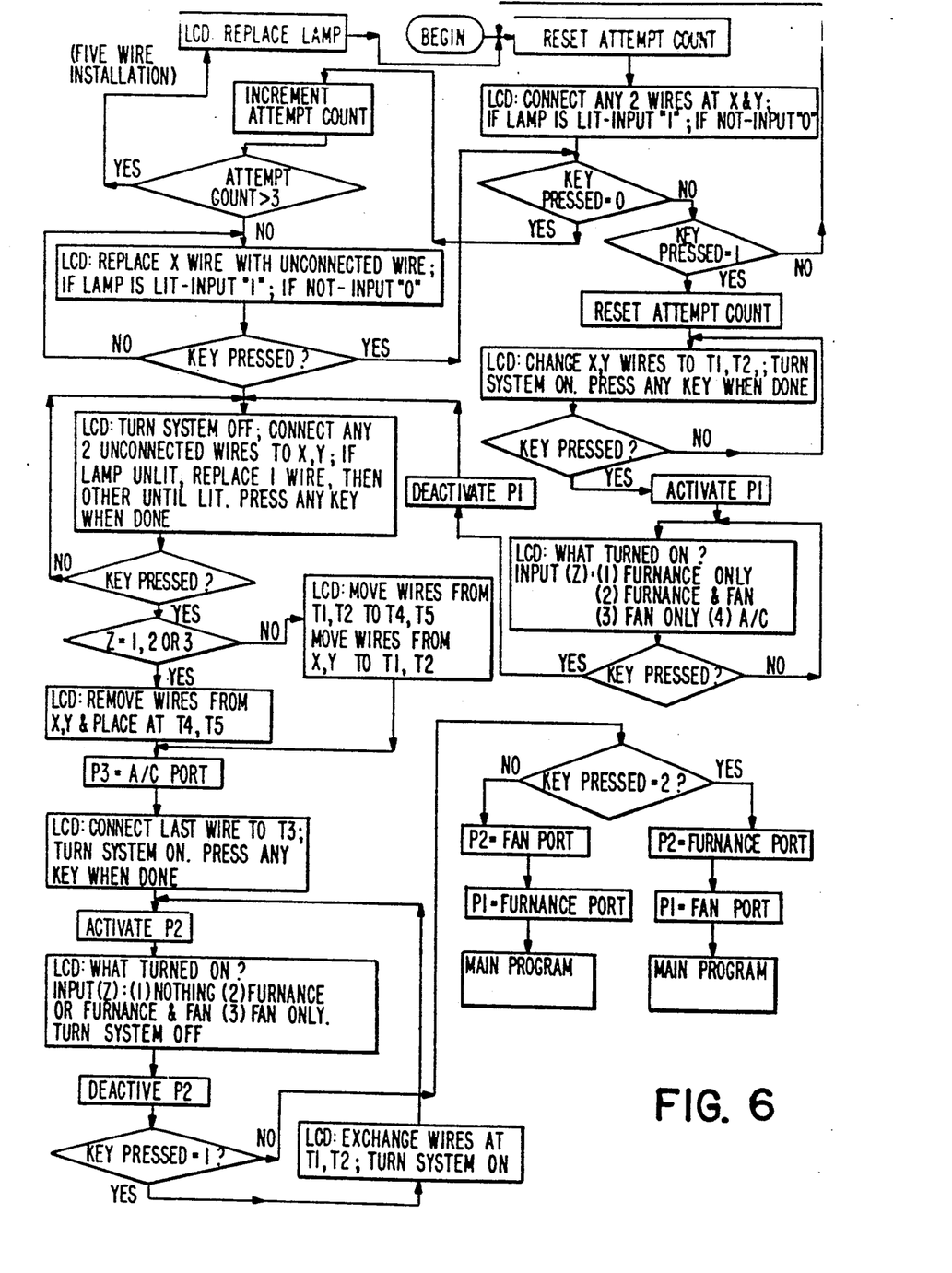
FIG. 6 illustrates the program routine for interaction with the system user to instruct proper connection of the thermostat to a five-wire HVAC system such as illustrated in FIG. 4.

The five-wire installation procedure is controlled by software represented by the flowchart illustrated in FIG. 6 to which specific reference is now made. After the Attempt Count parameter (to be described in detail below) is reset, the installer is instructed, in English at display 11, to connect any two of the five system wires (from FIG. 3) across the lamp circuit at terminals X and Y. If lamp 41 lights, it is an indication that one of the connected wires is either the 24 V AC fan/furnace line or the 24 V AC(A/C) line, while the other connected wire is the FAN, FURNACE or A/C line. More particularly, if both connected wires are 24 V AC lines from the two transformers, there is no voltage drop across or current path through the lamp and it will not light. Two connected control lines (FAN, FURNACE and A/C) yield the same result. When there is a voltage drop across the lamp, the lamp lights in spite of the fact that none of relays 34, 35 or 36 is energized because the drop across the lamp acts as a voltage divider preventing the entire twenty-four volts from energizing these relays. Assuming for the present that lamp 41 is not lighted by the two connected wires, the installer is instructed to enter a "0" character via keypad 12. This is detected by the system which then proceeds to increment the Attempt Count parameter and, if the Attempt Count is not greater than three, the system displays a further prompt for the installer. The Attempt count is used to keep track of the number of times that the installer connects a different pair of the five system wires across the lamp circuit. If more than three connection attempts are made without lighting lamp 41, the system directs the installer to replace the lamp which is assumed to be defective.

Assuming that the Attempt Count parameter is not greater than three, the display prompt instructs the installer to replace the wire connected at terminal X of the lamp circuit with one of the yet unconnected wires. A further prompt instructs the installer to enter a "1", if the lamp lights, or a "0", if it does not light. This procedure continues until the lamp 41 is lighted by the two wires connected to terminals X and Y.

Upon sensing that the key pressed by the installer is not "0", a check is made to be sure that the pressed key is a "1". If any other character was entered, an entry error exists and the system starts the installation procedure over again from the beginning. (Note—although not necessarily described and illustrated in conjunction with other software routines described herein, this return to the beginning of a routine may be incorporated after each character entry if an unacceptable character has been entered by the installer/operator).

If the entered character is a "1", the Attempt Count is reset and the system proceeds with a determination of which lines are connected across the lamp circuit. As part of this procedure the installer is instructed to remove the wires from terminals X and Y and place them at T2 and T1 and, when this is done, to turn the system on. The entry of any character by the installer from keypad 12 signifies that the installer has followed the instructions. (Note—although not necessarily specified in other software routines described herein, this technique of requiring entry of any character to acknowledge completion of a required task may be utilized throughout the system).

Computer output port P1 is actuated after the system has been turned on and an operative pair of wires have been connected to T1, T2. The installer is then prompted to enter a "1" if only the furnace is energized, a "2" if the furnace and fan are both energized, a "3" if only the fan is energized, or a "4" if the air conditioner is energized. A system parameter Z is assigned the value of the pressed key. Once the key is pressed and the value of Z assigned, the installer is instructed to connect any of the two remaining unconnected wires across the lamp circuit at terminals X and Y. If the two wires connected across the lamp circuit do not cause the lamp to light, the installer is instructed to replace one of these wires and then the other with unconnected wires until the lamp is lit. When two of the remaining three wires cause the lamp to light, the installer is instructed to so indicate by pressing any key. At this point the system determines whether or not the parameter Z, as entered by the installer when the system is turned on, is equal to one, two or three. If this is in fact the case, then the pair of wires presently connected across the lamp circuit must be the 24 V AC (A/C) and A/C lines. This is true, because if Z is equal to one, two or three, either the furnace only, the furnace and fan, or the fan only were energized when the system was turned on; the air conditioner was not energized by the two wires connected at T1 and T2. In order for the two wires connected across the lamp circuit at X and Y to cause lamp 41 to light, therefore, these two wires must be the two wires associated with the air conditioner control. Consequently, the air conditioner control lines connected across the lamp circuit should be connected to solid state relay 16 at T4 and T5, and the installer is so instructed if it is determined that the parameter Z is equal to one, two or three. The computer then assigns port P3 as the air conditioner port and relay 16 as the air conditioner control relay. On the other hand, if the parameter Z is equal to four, the installer is instructed to remove the two wires connected at T1, T2 and place them at T4, T5. The reason for this is that if the installer entered the character "4" signifying that the air conditioner was energized when the system was turned on, then the two wires connected at T1, T2 are the 24 V AC(A/C) and A/C lines. The installer is also instructed to move the wires across the lamp circuit at terminals X and Y to T1, T2. Port P3 is assigned as the air conditioner port.

After assignment of port P3 as the air conditioner port, the installer is prompted to connect the remaining unconnected wire to T3, and to turn the system on. After this has been done the computer output port P2 is activated and the installer is requested to enter a character indicating which, if any, of the components became energized by energization of relay 15. This entered character, the value of which is assigned as the new value of the parameter Z, is a "1" is nothing was energized, a "2" if the furnace only or furnace and fan are energized, and a "3" if the fan only is energized. The installer is also instructed to turn the system off at this point in time. If a "1" is entered, signifying that nothing was energized by relay 15, the installer is instructed to interchange the wires connected to T1 and T2 and to turn the system on. The software then loops back to the point where port P2 is activated and the installer is once again requested to enter a character indicating which component was energized. If a "2" is entered, the system recognizes that the FURNACE line is connected at T3 and acts accordingly by assigning computer port P2 as the furnace port and relay 15 as the furnace control relay. This leaves port P1 as the only unassigned port which must, under the circumstances, be the fan port. Accordingly, the fan port function is assigned to P1 and relay 14 is assigned the function of controlling the fan.

If the installer enters a "3[, indicating that only the fan has been assigned as the fan port and P1 is assigned the furnace function. In either case, after all of the three computer ports have been assigned a function, the software switches to the Main Program routine such as described in our aforementioned U.S. Pat. No. 4,725,001, or to an appropriate point in the program of any other set back or set forward electronic thermostat.

The foregoing installation procedures for the thermostat in either a four-wire or five-wire system are virtually foolproof in that they prompt the installer, who need not be particularly trained, to make appropriate connections until the correct connection for the system wiring is completed. The correct connection is readily achieved in a short period of time in spite of the fact that the four or five system wires are not labeled as to function.

BOILER INSTALLATION

A boiler typically is a two-wire system; that is, temperature control is effected from the thermostat by two wires to turn the boiler on and off. The cycling system disclosed in our U.S. Pat. No. 4,725,001 cannot efficiently operate with all commercially available boiler systems. For example, in a boiler system in which the liquid is continuously maintained at or near the normal system heating temperature (e.g., in order to have hot water available for fast response to heating demands), cycling below any temperature lower than that normal temperature is not possible; that is, the constant water temperature will control the boiler, not the space heating demand sensed by the thermostat. Under such circumstances it is desirable for the interactive thermostat to inform the homeowner/operator that the pre-existing system is not compatible with the thermostat being installed. Accordingly, the boiler installation procedure described below incorporates the incompatibility indication feature. It will be appreciated, of course, that this feature is not limited to the cycling control thermostat described in our aforesaid patent; rather, it is applicable to any thermostat that may not be compatible or operationally advantageous when used with particular heating/cooling systems.

Figure 7:
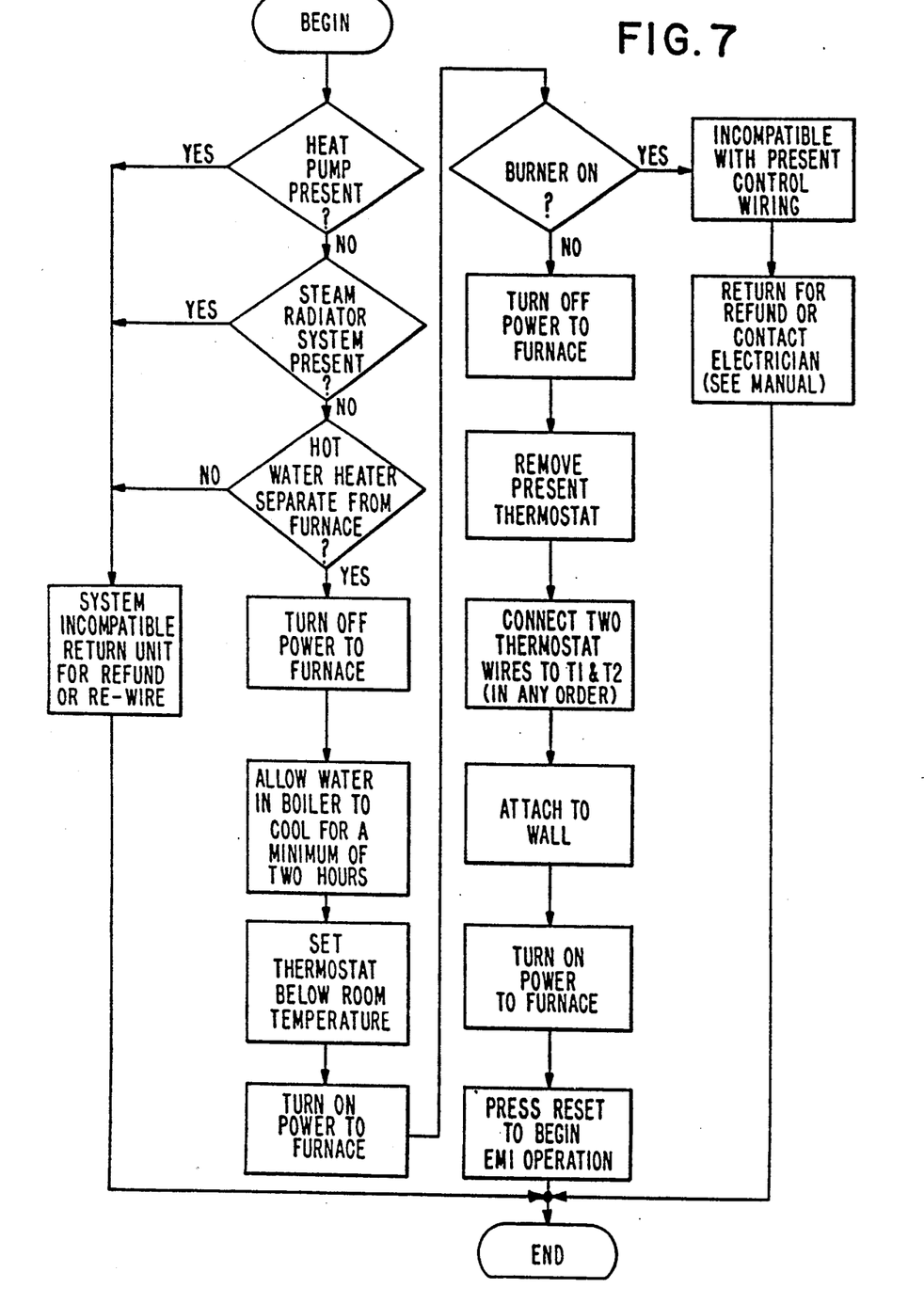
FIG. 7 illustrates the program routine for determining whether or not a pre-existing HVAC system is compatible with the thermostat being installed.

Referring now to the program routine flowchart illustrated in FIG. 7, the routine begins by the computer asking the homeowner, via display 11 (FIG. 1) whether or not the heating/cooling system includes a heat pump. If so, the operator enters a "1" at keypad 12 and the microprocessor 10 responds by providing a message at display 11 indicating that the heating/cooling system is incompatible and instructing the homeowner to rewire the system or return the thermostat for a refund. If the homeowner enters a "0", the microprocessor responds by asking whether or not a steam radiator system is present. If the homeowner answers in the positive (i.e., with a "1" entered at keypad 12), the system incompatible message is displayed. If the system is not of the steam radiator type, the homeowner's negative answer causes the software to inquire as to whether or not a hot water heater is employed separated from the furnace. If not, the system incompatibility message is displayed at any time, the program is terminated.

If the hot water heater is separate from the furnace, the positive response from the homeowner causes the microprocessor to instruct the homeowner to remove power from the furnace if such power has not been previously removed, and the homeowner is required to indicate that this has been done by depressing an appropriate key at keypad 12. Thereafter the microprocessor displays an instruction requiring that the water in the boiler be allowed to cool for a minimum of two hours. The response to this may either by an entry at the keypad by the homeowner after the appropriate amount of time has elapsed, or an automatic timed sequence initiated by the microprocessor to assure that the minimum two hour interval has elapsed. In either case, the operator is then instructed to set the thermostat to a temperature below room temperature and then to apply power to the furnace; the operator is required to acknowledge completion of each of these tasks by depression of an appropriate key at the keypad 12. At this point in the program the operator is requested to indicate whether or not the burner is on by depressing a "1" for a positive response and a "0" for a negative response. The purpose of these last few steps in the program is to determine if the circuitry controlling the heating/cooling system are compatible with the thermostat control system described in our aforementioned U.S. Pat. No. 4,725,001. In particular, the test determines whether or not the thermostat in the system controls both the burner and circulator pump, or only the circulator pump. If there is internal temperature control (e.g., an immersion control, etc.), the automatic thermostat described in our aforementioned patent cannot cycle the water temperature in the system. If the thermostat does not control the burner, the operator may return the unit for a refund or rewire the system to render it compatible (i.e., so that the thermostat controls both the burner and the circulator pump). Thus, is the burner becomes energized when power is applied to the furnace, it is clear that something other than the thermostat is in control. If the burner is not on, the thermostat controls the burner and the system is compatible.

Assuming the system to be compatible, the operator is instructed to remove power from the furnace and then remove the old thermostat from the system. After this has been done, as indicated by appropriate entry from keypad 12, the wire connection portion of the program begins. Since the thermostat in a boiler system has only two wires connected thereto, the user is instructed to connect the two thermostat wires to terminals T1 and T2, in any order, at microprocessor 10. Under such circumstances the solid state relay 14 is assigned to control boiler operation in accordance with the temperature sensed by the thermostat. The operator is then instructed to attach the new thermostat to the wall, apply power to the furnace and then press the reset button at the keypad to initiate the main program operation.

Automatic Connection

It is within the scope of the present invention to arrange the interactive thermostat such that is automatically adapts itself to any connections, made by the installer, of the HVAC system wires to the thermostat. In this regard reference is made to FIG. 8 of the accompanying drawings. The circuitry is similar to that illustrated in FIG. 1 in that microprocessor 10 functions in the same manner with display 11, keypad 12, temperature sensor 13 and solid state relays P1, P2 and P3, respectively. An additional solid state relay 18 is provided in the circuit of FIG. 8 and is driven by the microprocessor output port P4. When the contacts of relay 18 are closed, solenoid 15 is energized and changes the position of each of the four-poles of the four-position solenoid-driven switch, the poles of which are designated 51, 52, 53 and 54.

Figure 8:
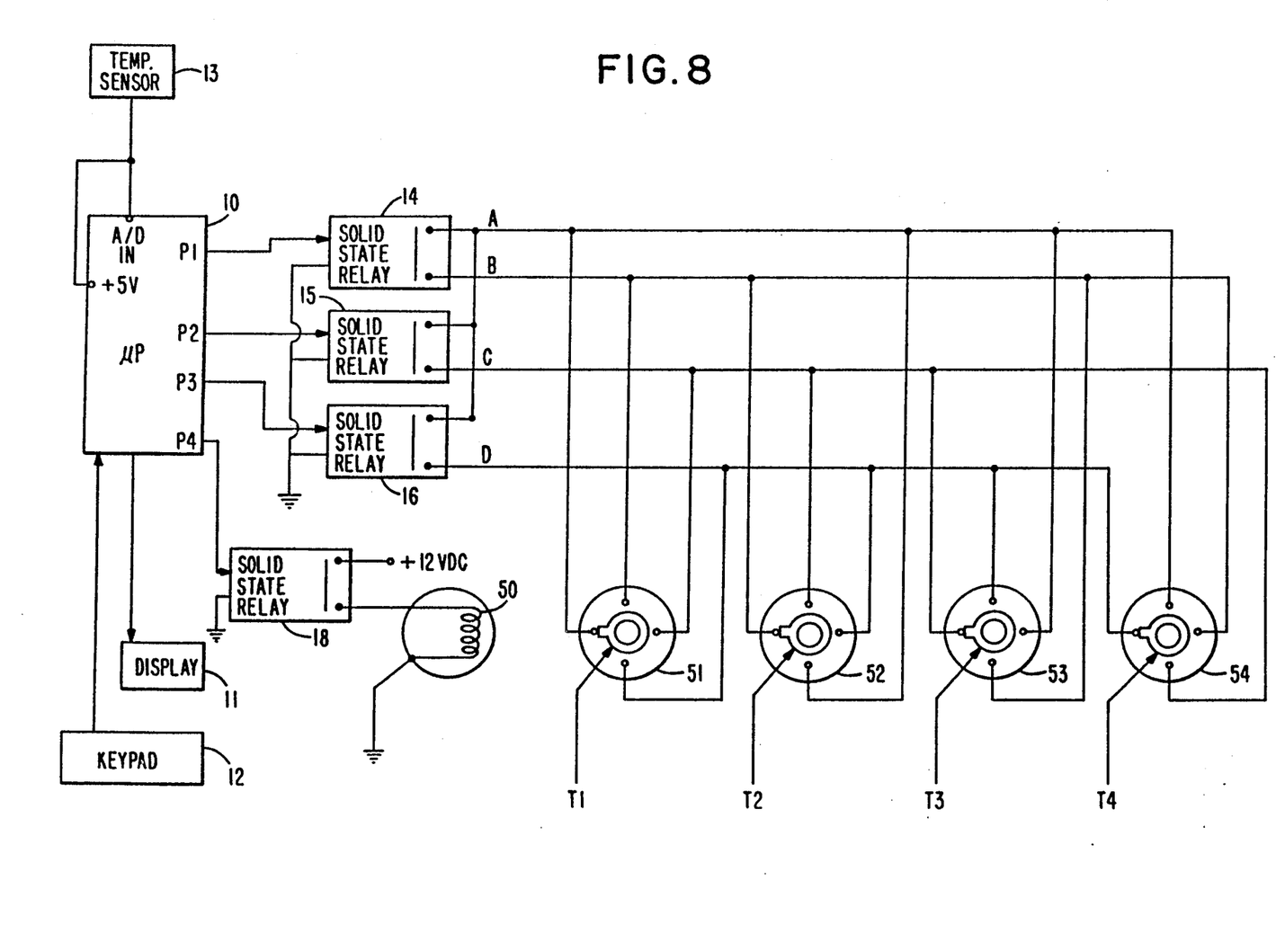
FIG. 8 is a schematic circuit diagram of an alternative embodiment of an interactive electronic thermostat according to the present invention wherein thermostat control circuits are automatically assigned to the proper wires from the HVAC system irrespective of the thermostat terminals to which the wires are connected.

Solid state relays 14, 15 and 16 have their contacts connected to four lines A, B, C and D such that line A is connected to one contact of each of the relays while lines B, C and D are connected to the other contact at respective relays 14, 15 and 16. The four positions of the switch poles 51, 52, 53 and 54 are connected, via lines A, B, C and D, to different contacts of relays 14, 15 and 16, depending upon the position of the solenoid-driven switch. The common terminal at each switch pole 51, 52, 53 and 54 is connected to a respective thermostat terminal T1, T2, T3 and T4. Thus, the thermostat terminals are controllably connected to different contacts of relays 14, 15 and 16 via lines A, B, C and D in accordance with the position of the solenoid-driven switch. Table I is a chart showing the line (i.e., A, B, C and D) to which each thermostat terminal (T1, T2, T3, T4) is connected for each switch position.

TABLE I

| Switch Position | T1 | T2 | T3 | T4 |
|---|---|---|---|---|
| 1 | A | B | C | D |
| 2 | B | C | D | A |
| 3 | C | D | A | B |
| 4 | D | A | B | C |

In use, when the thermostat of FIG. 8 is installed, the installer may connect the four HVAC system lines (see FIG. 2) to any of the thermostat terminals T1, T2, T3 and T4. Depending upon the installer's response to certain prompts and queries originating at microprocessor 10 and displayed at display 11, the microprocessor drives solenoid 50 to different sequential positions until certain conditions are satisfied. The solenoid driven switch, therefore, permits the installer to connect each HVAC system wire only once; the computer automatically actuates the switch to achieve the proper connections. This operation is illustrated in the software flow-chart of FIG. 9 to which specific reference is now made.

Figure 9:
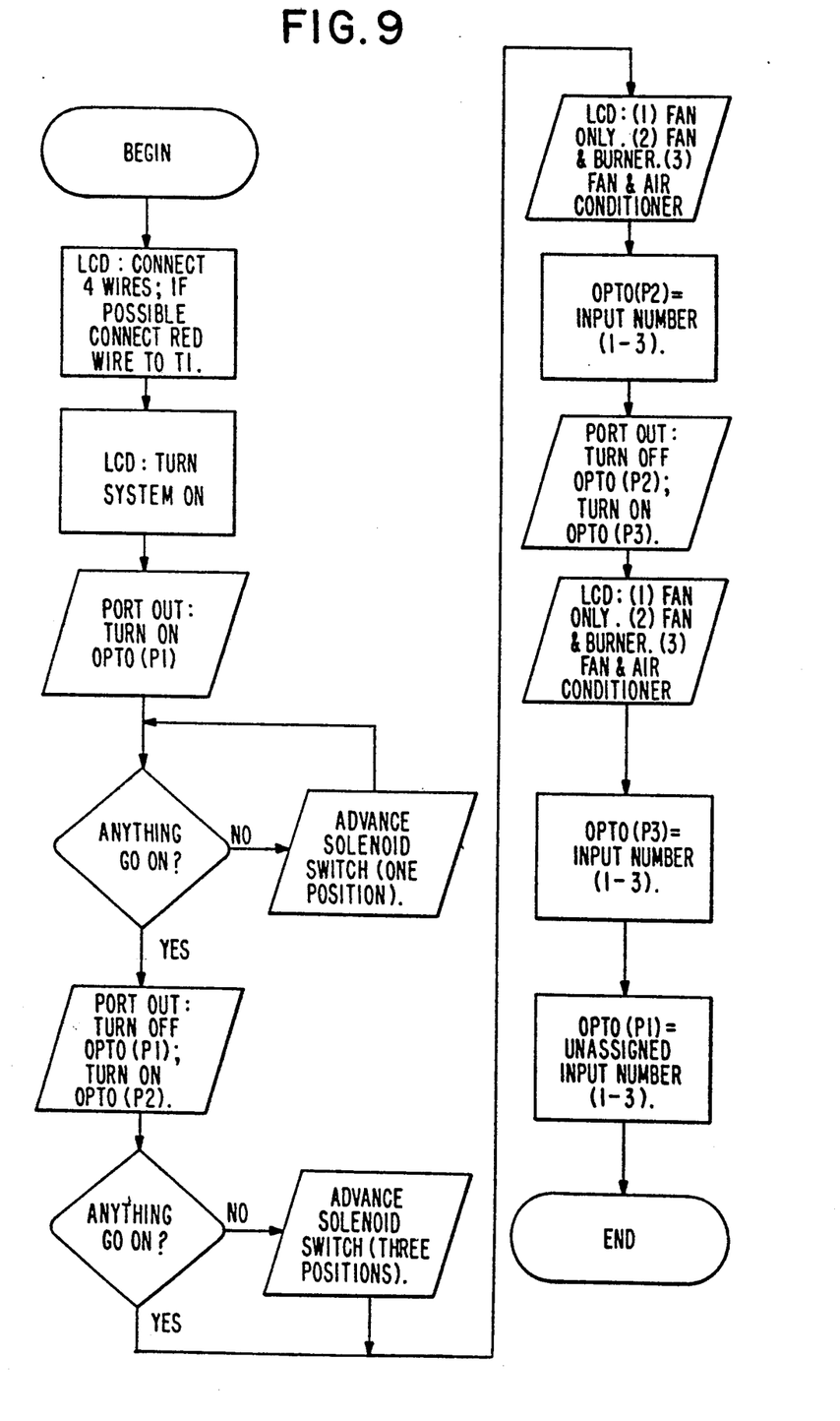
FIG. 9 illustrates the program for use with the circuit of FIG. 8 to automatically assign the thermostat control circuits to the HVAC system wires.

After entry into the four-wire installation routine illustrated in FIG. 9, the installer is instructed to connect all four wires to respective thermostat terminals T1, T2, T3 and T4 with the red wire being connected to terminal T1 if at all possible. Although not illustrated in FIG. 9, the installer is also instructed to press the zero key at the keypad after the wires have been connected. Thereafter the installer is instructed to turn the system on (i.e., apply power to the HVAC system). When this has been done, as signified by the 0 or other key being depressed at keypad 12, output port P1 of microprocessor 10 provides a signal to energize solid state relay 14. The installer is then requested to indicate, by depression of an appropriate key at keypad 12, whether or not any component (i.e., the fan, the furnace or the air conditioner) of the HVAC system was activated. It should be noted that, for the initial position of the solenoid-driven switch, thermostat terminals T1 and T2 are connected to lines A and B and therefore to the contacts of solid state relay 14. If the 24 V AC system line is connected to either of terminals T1 and T2, then one of the HVAC system components (i.e., the component for which the line is connected to the other of terminals T1 and T2) is energized at this time. The installer indicates by depression of an appropriate key whether or not a component is, in fact energized. If nothing is energized, the microprocessor provides an actuation signal at output port P4 to energize solid state relay 18 and thereby drive solenoid 50 to rotate the switch one position (i.e., position 2 wherein the movable contact of each of poles 51, 52, 53 and 54 is at twelve o'clock in the drawing). This routine repeats until such time as a system component is energized by the actuation of solid state relay 14, thereby indicating that one of lines A and B is connected to the 24 V AC system line. Once this has occurred the microprocessor 10 turns off output port P1 to de-energize solid state relay 14, and energizes output port P2 to actuate solid state relay 15. The installer is once again requested to indicate whether or not any of the system components has been energized. If a system component is energized at this time, then the 24 V AC line is properly connected to the A line and therefore to one contact of each of solid state relays 14, 15 and 16. On the other hand, if none of the system components are energized at this time, then the 24 V AC line is connected to the B line and, hence, only to solid state relay 14. Assuming the latter to be the case, the installer enters an indication, via keypad 12, that no component of the system has been energized. The microprocessor responds at output port P4 by causing solid state relay 18 to advance the solenoid-driven switch three positions. In this regard, it will be noted that each of the switch poles 51, 52, 53 and 54 is wired such that the position of the pole in which its assigned thermostat terminal is connected to line A is actually three clockwise positions removed from the position in which the pole interconnects it thermostat terminal with line B. Thus, for example, assume that the solenoid-driven switch is initially in position 3, its three-o'clock position, wherein thermostat terminal T4 is connected by switch pole 54 to line B and hence solid state relay 14. From the previous description we have determined that line B is connected to the 24 V AC system line which must, therefore, be connected to thermostat terminal T4. In order to properly apply the 24 V AC system line to all three of solid state relays 14, 15 and 16, then switch pole 54 must connect thermostat terminal T4 to the A line. This is achieved, as described, by causing the solenoid-driven switch to be rotated three clockwise positions, namely to position 2, the twelve o'clock position, wherein switch pole 54 connects thermostat terminal T4 to line A. On the other hand, if, upon actuation of solid state relay 15, one of the HVAC system components is energized, the microprocessor determines, from the installer response, that the 24 V AC line is properly connected to line A at each of the solid state relays 14, 15, 16.

Once the 24 V AC line is properly connected to line A, the microprocessor causes the display 11 to request the installer to actuate an appropriate key at keypad 12 in accordance with which of the system components has been energized. Thus, if only the fan has been energized, the installer is instructed to depress key 1; if the fan and the burner have been energized, the installer is requested to depress key 2; and if the fan and air conditioner have been energized, the installer is instructed to depress key 3. The thusly indicated energized system component is then assigned to solid state relay 15 and to microprocessor output port P2. The microprocessor then de-actuates solid state relay 15 at output port P2 and energizes solid state relay 16 at output port P3. The installer is once again requested to actuate an appropriate key at keypad 12 to indicate which of the system components has been energized. The appropriate function is assigned to solid state relay 16 and output port P3, and the remaining unassigned function is assigned to output port P1 and solid state relay 14. The program routine then ends with all of the HVAC system wires properly connected and identified at the computer ports.

It will be appreciated that the solenoid-driven four-pole switch may be replaced by a switching matrix. Alternatively, a manual thumbwheel switch, or the like, may be employed whereby the installer advances the switch positions, under computer instruction, until the HVAC system lines are properly connected. The manually-actuated switch is less expensive than a solenoid-driven switch and still permits a one-time only connected of the four system wires to thermostat terminals. This same approach described above for permitting one-time only connections in a four-wire system may also be employed for a five-wire system.

Conclusion

The preferred embodiment of the interactive thermostat of the present invention, as disclosed herein, takes the form of a general purpose microprocessor operating under the control of unique software to achieve the stated objectives. It is to be understood, of course, that the invention also encompasses within its scope embodiments comprised of special purpose analog and/or digital hardware alone as well as such special purpose hardware used in combination with appropriate software.

Although the preferred embodiment is described as automatically configuring assigned control ports and relays (i.e., control circuits) to control the specific devices (i.e., furnace, fan, air conditioner), it is within the scope of the present invention to instruct the installer to activate appropriate switches or other components to configure the system relays pursuant to the assigned functions.

From the foregoing description it will be appreciated that the present invention makes available a novel interactive electronic thermostat and a unique method for permitting a homeowner or other user of the electronic thermostat to properly install the thermostat without fear of improper electrical connections.

Having described preferred embodiments of a new and improved interactive electronic thermostat and method for operating same in accordance with the present invention, it is believed that other modifications, variations and changes will be suggested to those skilled in the art in view of the teachings set forth herein. It is therefore to be understood that all such variations, modifications, and changes are believed to fall within the scope of the present invention as defined by the appended claims.

What is claimed is:

1. An electronic thermostat for controlling the operation of a temperature-modifying apparatus of a type having a plurality of wires to which the thermostat must be connected, said thermostat comprising:

data entry means for permitting manual entry of data into said thermostat;

means for providing individual messages in a spoken language;

means for providing a sequence of prompts to instruct an installer to perform corresponding steps in a procedure for providing electrical connections from the wires of said apparatus to points in said thermostat, and for requesting manual entry of response data via said data entry means to indicate the effect on the apparatus as certain of said steps are performed; and control means responsive to entry of said response data for structuring said thermostat for proper operation with the connections of said wires by said user.

2. The thermostat according to claim 1 wherein said plurality of wires consists of four wires.

3. The thermostat according to claim 1 wherein said plurality of wires consists of five wires.

4. The thermostat according to claim 3 further comprising line test means for testing said wires two at a time and providing an indication when only one of the tested wires is a supply line.

5. The thermostat according to claim 1 wherein said temperature-modifying apparatus is a boiler and wherein said plurality of wires comprises at least two wires.

6. The thermostat according to claim 5 wherein said plurality of wires consists of two wires.

7. The thermostat according to claim 1 wherein said temperature-modifying apparatus includes at least two individually-actuable temperature modifying devices, and wherein said control means comprises:

first and second control circuits; and means for assigning control over actuation of each of said temperature-modifying devices to a respective control circuit of said first and second control circuits in response to said response data.

8. The thermostat according to claim 7 wherein said sequence of prompts includes an instruction to the user to disconnect at least one of said wires from said thermostat and replace it with another of said wires.

9. The thermostat according to claim 7 wherein said control means includes means responsive to improper connections of said wires to said control circuits for automatically properly connecting said wires to said control circuits.

10. A method for automatically interacting between an electronic thermostat and an installer for the purpose of effecting proper electrical connections required at the thermostat for a plurality of wires of a temperature-modifying apparatus controlled by the thermostat, said thermostat including means for automatically structuring said thermostat for proper operation of said apparatus with connections of said wires to said thermostat, said method comprising the steps of:

requesting and receiving entry of installer-initiated indications into said thermostat;

providing a plurality of sequential instructional prompts in a commonly spoken language to instruct the installer to follow respectiev steps to effect proper operation of said apparatus for the electrical connections of said plurality of wires at said thermostat, said prompts also including instructions to the installer to enter installer-observed responses of said apparatus; and causing said structuring means to automatically structure said thermostat for proper operation of said apparatus with connections of said wires in response to entered installer-observed apparatus responses.

11. The method according to claim 10 wherein said installer-observed apparatus responses are manually entered into said thermostat as coded indicia for those responses.

12. The method according to claim 10 wherein said instructional prompts are displayed at a visual display.

13. The method according to claim 10 wherein said instructional prompts are audible.

14. The method according to claim 10 wherein said temperature-modifying apparatus is a forced air heating and air conditioning system, wherein said thermostat includes four terminals T1, T2, T3 and T4, and wherein said plurality of wires includes four wires, namely: a supply wire, a fan wire, a furnace wire and an air conditioner wire, and wherein said method includes the following steps in sequence:

(a) instructing the installer to remove power from the apparatus;

(b) instructing the installer to connect said four wires to the four terminals at the thermostat without necessarily identifying which wires are to be connected to which terminals;

(c) instructing the installer to apply power to the apparatus;

(d) activating a first control circuit between terminals T1 and T2 at said thermostat;

(e) instructing the installer to indicate which of the following conditions is in effect at the apparatus; (1) fan unit on; (2) air conditioner unit on; (3) furnace unit on; (4) none of the units on;

(f) in response to indication of condition (4) at step (e):

(f.1) instructing the installer to remove power from the apparatus so that the pair of wires connected at terminals T1, T2 can be exchanged with the pair of wires connected at terminals T3, T4; and (f.2) repeating steps (c), (d) and (e);

(g) in response to entry of conditions (1), (2) or (3) at step (e), assigning to said first control circuit the function of controlling the unit designated by that entered condition;

(h) activating a second control circuit between terminals T1 and T3 at said thermostat;

(i) instructing the installer to enter coded indicia indicating which of the following conditions is in effect at the apparatus: (1) fan unit on; (2) air conditioner unit on; (3) furnace unit on; and (4) none of the units on; and (j) in response to entry of conditions (1), (2) or (3) at step (i), assigning to said second control circuit the function of controlling the unit designated by that entered condition.

15. The method according to claim 14 further including the steps of:

(k) activating a third control circuit between terminals T1 and T4 at said thermostat;

(l) instructing the installer to enter coded indicia indicating which of the following conditions is in effect at the apparatus: (1) fan unit on; (2) air conditioner unit on; (3) furnace unit one; and (4) none of the units on; and (m) in response to entry of conditions (1), (2) or (3) at step (1), assigning to said third control circuit the function of controlling the unit designated by that entered condition.

16. The method according to claim 14 further including the steps of:
  in response to entry of condition (4) at step (i):
    instructing the installer to remove power from the apparatus, to exchange the wire connections at terminals T1 and T2, and to reapply the power to the apparatus; and
  repeating steps (h) and (i).

17. The method according to claim 10:
  wherein the temperature-modifying apparatus is a forced air heating and air conditioning system having three controlled units, namely a furnace, an air conditioner and a fan;
  wherein said thermostat includes three control circuits each capable of controlling operation of any of said units; and
  wherein the method further includes the step of assigning each of said control circuits the function of controlling a respective one of said units on the basis of said installer-observed apparatus responses.

18. The method according to claim 10 wherein the number of wires in said plurality differs for different types of said apparatus, wherein said method includes the steps of:
  instructing the installer to indicate the number of said wires; and
  initiating respective prompt routines in accordance with the number of wires in the apparatus as indicated by the installer.

19. The method according to claim 10 further comprising the steps of:
  instructing the installer to identify the type of said temperature-modifying apparatus; and
  in response to certain types of apparatus identified by the installer, advising the installer that the apparatus is not advantageously controlled by said thermostat.

20. The method according to claim 10 wherein said temperature-modifying apparatus is a forced air heating and air conditioning system, wherein said thermostat includes four thermostat terminals T1, T2, T3 and T4, four control lines A, B, C and D, and actuable switching means for connecting said terminals to said control lines individually and in any combination, wherein said plurality of wires includes four wires, namely a supply wire, a fan wire, a furnace wire and an air conditioner wire, wherein said method includes the following steps:
  (a) instructing the installer to connect said four wires to the four thermostat terminals without necessarily identifying which wires are to be connected to which thermostat terminals;
  (b) instructing the installer to apply power to the apparatus;
  (c) activating a first control circuit between control lines A and B at said thermostat;
  (d) instructing the installer to indicate whether or not any part of the apparatus was actuated in response to step (c);
  (e) in response to a negative by the installer at step (d), actuating said switching means to change which thermostat terminals are connected to which control lines, and repeating step (d);
  (f) in response to a positive indication by the installer at step (d), de-activating the first control circuit and activating a second control circuit between control lines A and C;
  (g) instructing the installer to indicate whether or not any part of the apparatus was actuated in response to step (f);
  (h) in response to a negative indication by the installer at step (g), actuating the switching means such that the thermostat terminal to which the supply wire is connected is electrically connected to control line A;
  (i) in response to either a positive indication by the installer at step (g) or to completion of step (h), instructing the installer to indicate which of the following conditions is in effect at the apparatus: (1) fan unit one; (2) air conditioner unit on; and (3) furnace unit on;
  (j) in response to entry of conditions (1), (2) or (3) at step (i), assigning to said second control circuit the function of controlling the unit designated by that entered condition; and
  (k) deactivating the second control circuit and activating a third control circuit between control lines A and C.

21. The method according to claim 20 further comprising the steps of:
  (l) instructing the installer to indicate which of the following conditions is in effect at the apparatus: (1) fan unit on; (2) air conditioner unit on; and (3) furnace unit on;
  (m) in response to entry of conditions (1), (2) or (3) at step (l), assigning to said third control circuit the function of controlling the unit designated by that entered condition; and
  (n) assigning to said first control circuit the function of controlling the unit not previously assigned.

22. The method according to claim 10 wherein said temperature-modifying apparatus includes n independently-actuable and electrically-energizable devices, wherein n is an integer equal to at least two, wherein the number of said wires is an integer equal to at least n+1 and at least one of said wires serves as a power supply line for each of at least two of said devices, wherein said thermostat includes n actuable controllers to be assigned the function of controlling said n devices, respectively, and wherein said method includes the steps of:
  (a) instructing the installer to connect said wires to respective terminals at said thermostat without necessarily specifying which wires are to be connected to which terminals;
  (b) instructing the installer to apply power to said apparatus and to enter an indication of which, if any, of said electrically-energizable devices is energized;
  (c) in response to the indication entered in step (b):
    (c.1) if the entered indication is that none of said devices is energized, automatically changing internal connections in said thermostat between said terminals and said controllers, and repeating steps (b) and (c);
    (c.2) if the entered indication is that any of said devices is energized, assigning to a first of said controllers the function of controlling that energized device.

23. The method according to claim 22 where n is equal to three and further including the steps of:
  (d) in response to completion of step (c.2), automatically actuating a second of said controllers and instructing the installer to enter an indication of which of the electrically-energizable devices is energized;

(e) in response to the indication entered in step (d), assigning to said second controller the function of controlling the device indicated as being energized in step (d); and (f) assigning to a third of said controllers the function of controlling the electrically-energizable device for which the control function has not previously been energized.

24. The method according to claim 22 further comprising the steps of:

(d) in response to completion of step (c.2), automatically actuating, in sequence, n−2 of the remaining n−1 of said controllers and instructing the installer after each such actuation to enter an indication of which of the electrically-energizable devices is energized; and (e) in response to the indication entered after each actuation in step (d), assigning to the actuated controller the function of controlling the device so indicated as being energized.

25. The method according to claim 24 further comprising the step of:

(f) when only one of said controllers is left unassigned the function of controlling the device, and only one device remains with its control unassigned to a controller, automatically assigning to said only one controller the function of controlling said only one device.

26. In an electronic thermostat for controlling the operation of an HVAC system having a furnace, an air conditioner and a ventilation fan and at least four wires to which the thermostat must be connected, wherein one of said wires is a power supply wire common to said furnace, air conditioner and fan, an apparatus for assisting an installer in the installation of the thermostat, said apparatus comprising:

at least four thermostat terminals T1, T2, T3 and T4;

a first selectively actuable control circuit for providing a connection between terminals T1 and T2;

a second selectively actuable control circuit for providing a connection between terminals T1 and T3;

a third selectively actuable control circuit for providing a connection between terminals T1 and T4;

means for instructing the installer to remove power from the HVAC system, then to connect said four wires to said four terminals without necessarily identifying which wires are to be connected to which terminals, then to apply power to the HVAC system, and then to provide a first indication that the power has been so applied;

means responsive to said first indication for actuating said first control circuit and instructing the installer to provide an indication as to whether (1) the furnace is energized, (2) the air conditioner is energized, (3) only the fan is energized, or (4) none of the furnace, air conditioner or fan are energized; and means responsive to indication (4) for de-actuating said first control circuit, then instructing the installer to: remove power from the HVAC system; then exchange the wires connected to terminals T1 and T2 with the wires connected to terminals T3 and T4; then to restore power to the HVAC system; and then to provide a second indication that the power has been so restored.

27. The apparatus according to claim 26 further comprising:

means responsive to said second indication for actuating said first control circuit and instructing the installer to provide said indications (1), (2), (3) or (4);

means responsive to said indication (1) for assigning control of said furnace to said first control circuit;

means responsive to said indication (2) for assigning control of said air conditioner to said first control circuit; and means responsive to said indication (3) for assigning control of said fan to said first control circuit.

28. The apparatus according to claim 27 further comprising:

means responsive to assignment of control of one of said furnace, air conditioner and fan to said first control circuit for de-actuating said first control circuit, actuating said second control circuit and then instructing the installer to provide a further indication as to whether (5) the furnace is energized, (6) the air conditioner is energized, (7) only the fan is energized, or (8) none of the furnace, air conditioner or fan are energized;

means responsive to indication (8) for de-actuating said second control circuit, then instructing the installer to: remove power from the HVAC system; then exchange the wire connected to terminal T1 with the wire connected to terminal T2; then restore power to the HVAC system; and then provide a third indication that the power has been so restored;

means responsive to said third indication for actuating said second control circuit and then instructing the installer to provide indications as to whether (5) the furnace is energized, (6) the air conditioner is energized or (7) only the fan is energized;

means responsive to said indication (5) for assigning control of said furnace to said second control circuit;

means responsive to said indication (6) for assigning control of said air conditioner to said second control circuit; and means responsive to said indication (7) for assigning control of said fan to said second control circuit.

29. The apparatus according to claim 28 further comprising:

means for assigning to said third control circuit the control of whichever of said furnace, air conditioner or fan has not had its control assigned to said first or second control circuits.

30. The apparatus according to claim 29 further comprising:

means for determining when the installation of the thermostat is completed by detecting when all of said first, second and third control circuits have been assigned to control a respective one of said furnace, air conditioner and fan.

31. The apparatus according to claim 29 wherein said thermostat includes a microprocessor having first, second and third output ports connected to said first, second and third control circuits, respectively, wherein actuation of said means for actuating said first control circuit includes means for providing an actuating signal from said first output port, wherein said means for actuating said second control circuit includes means for providing an actuating signal from said second output port, and wherein said means for actuating said third control circuit includes means for providing an actuating signal from said third output port.

32. In an electronic thermostat for controlling the operation of an HVAC system having a furnace, an air conditioner and a ventilation fan and at least four wires to which the thermostat must be connected, wherein one of said wires is a power supply wire common to said furnace, air conditioner and fan, an apparatus for assisting an installer in the installation of the thermostat, said apparatus comprising:

at least four thermostat terminals T1, T2, T3 and T4;

a first selectively actuable control circuit for providing a connection between said first and second control lines;

a second selectively actuable control circuit for providing a connection between said first and third control lines;

a third selectively actuable control circuit for providing a connection between said first and fourth control lines;

switching means for connecting each of said terminals to a respective one of said control lines, said switching means being selectively actuable to change which terminal is connected to which control line;

means for instructing the installer to remove power from the HVAC system, then to connect said four wires to said four terminals without necessarily identifying which wires are to be connected to which terminals, then to apply power to the HVAC system, and then to provide a first indication that the power has been so applied;

means responsive to said first indication for actuating said first control circuit and instructing the installer to provide an indication as to whether (1) the furnace is energized, (2) the air conditioner is energized, (3) only the fan is energized, or (4) none of the furnace, air conditioner or fan are energized; and means responsive to indications (1), (2), (3) and (4) for de-actuating said actuating said switching means to automatically change which of said terminals are connected to which of said control lines until the terminal to which said supply wire is connected is connected to said first control line.

* * * * *